United States Patent [19]
Billings

[11] Patent Number: 5,404,444
[45] Date of Patent: Apr. 4, 1995

[54] INTERACTIVE AUDIOVISUAL APPARATUS

[75] Inventor: Zeb Billings, Bonita Springs, Fla.

[73] Assignee: Sight & Sound Incorporated, New Berlin, Wis.

[21] Appl. No.: 14,158

[22] Filed: Feb. 5, 1993

[51] Int. Cl.$^6$ .............................................. G06F 15/00
[52] U.S. Cl. ..................................... 395/161; 434/169
[58] Field of Search ............... 434/185, 167, 169, 172, 434/317; 395/152, 155, 159, 161

[56] References Cited

U.S. PATENT DOCUMENTS

| | | | |
|---|---|---|---|
| 4,846,693 | 7/1989 | Baer | 434/308 |
| 4,884,972 | 12/1989 | Gasper | 434/185 |
| 5,111,409 | 5/1992 | Gasper et al. | 395/152 |
| 5,145,447 | 9/1992 | Goldfarb | 446/408 |
| 5,209,665 | 5/1993 | Billings et al. | 434/169 |

*Primary Examiner*—Mark R. Powell
*Assistant Examiner*—Huynh Ba

*Attorney, Agent, or Firm*—Amster, Rothstein & Ebenstein

[57] ABSTRACT

An interactive audiovisual work for telling a story includes a story element selector for selecting one of a plurality of differing actuatable story elements to be active, a character selector for selecting one of a plurality of differing actuatable characters to be active, and an identifier, active after a story element is selected, for identifying the character intended to be selected to be active at a given time according to the story. A microprocessor, responsive to the story element selector, the character selector and the character identifier, causes the selected character to speak a first-level message associated with the selected story element if the selected character and the identified character are the same, and a second-level message associated with the selected character otherwise, the first-level message being more specific and closely related to the selected story element than the second-level message.

19 Claims, 5 Drawing Sheets

INTERACTIVE AUDIOVISUAL APPARATUS

BACKGROUND OF THE INVENTION present invention relates to an interactive audiovisual work for telling a story, and more particularly to a book incorporating a sound chip for producing sounds associated with the text of the book.

There are a variety of different "talking books" on the market which incorporate a sound chip so that the talking book can produce a variety of sounds, each sound being related to a specific textual portion of the book (which may be a graphic symbol). Typically the generation of sound effects results from the reader pressing one of a number of sound generating switches provided in a switch portion of the book. The reader actuates a sound-generating switch when there is identity between the symbol in the text portion of the book and the symbol on a sound-generating switch of the switch portion of the book, or because the symbol in the text portion is connected by a visible line to a particular sound-generating switch, or if there is some other means of causing association between a specific text portion and a specific sound-generating switch.

While the ability to generate sound effects greatly enhances the play value of a "talking book" relative to a conventional book, there is a limit to which the presence of sound effects—whether speech or otherwise—can increase the play value. As typically only one sound effect or monologue results from the actuation of a single sound-generating switch, and there is only space for a limited number of such switches on the book, the number of sound effects obtainable is quite limited (even though the sound chip itself is typically capable of producing many more sound effects). Worse yet, because there is a one-to-one correspondence between a sound-generating switch and the sound effect generated, even a youngster quickly learns to associate the sound effect and the switch so that the book loses any element of unpredictability and surprise.

A further limitation of the known "talking books" is that the various sound effects generated do not simulate a cycle of interactive or alternating conversations which involves the user. Thus, while it is a possible for a given sound effect in a conventional talking book to produce what appears to be a dialogue or conversation between two characters, this dialogue results from the one-time actuation of a single sound-generating switch and does not require any participation by the user. In other words, after actuation of the sound-generating switch, the dialogue or connection simply runs its course without regard to the user so that the user does not feel himself to be a part of the conversation. It is theorized that one reason for this limitation is the fear of the designer of such talking books that, if user interaction is required (especially when the user is a child), the user may interact in an unexpected or improper way with the ongoing dialogue so that it will no longer make sense, will be prematurely terminated, or will take a different tack.

Accordingly, it is an object of the present invention to provide an interactive audiovisual work for telling a story where there are more sound effects (including conversations) than there are sound-generating switches.

Another object is to provide such a work wherein actuation of a given sound-generating switch may at different times result in the generation of different sound effects or speech phrases.

A further object is to provide such a work which can mimic or simulate interactive or alternating conversations in which the user participates by selecting which characters talk when.

It is another object of the present invention to provide such a work wherein the user cannot substantively alter the conversation produced in response to actuation of a sound-generating switch, but can only delay its completion and cause irrelevant but not inappropriate interjections thereinto.

SUMMARY OF THE INVENTION

It has now been found that the above and related objects and features are obtained in an interactive audiovisual work for telling a story, according to the present invention. The work comprises a plurality of differing actuatable story elements of the story and a plurality of differing actuatable characters of the story. A plurality of differing first-level messages are associated with the story elements and form an optional part of the story, while a plurality of differing second-level messages are associated with the characters. The work includes a story element selector for selecting one of the plurality of story elements to be active and a character selector for selecting one of the plurality of characters to be active. Means, active after a story element is selected, identify the character intended to be selected to be active at a given time according to the story, and means responsive to the story element selector, the character selector and the character identifying means, cause the selected character to speak a first-level message associated with the selected story element if the selected character and the identified character are the same, and a second-level message associated with the selected character otherwise.

A first-level message is more specific and closely related to the selected story element than a second-level message, while a second-level message is more general and less related to the selected story element than a first-level message. The story element selector preferably produces a sound associated with the selected story element.

In a preferred embodiment, a plurality of differing first-level messages are associated with at least one of the story elements, and means are provided for selecting the first-level message to be spoken from the plurality of differing first-level messages associated with a selected story element. Preferably a plurality of differing second-level messages are associated with each of the characters, and means are provided for selecting the second-level message to be spoken from the plurality of differing second-level messages associated with a selected character. The first-level message selecting means is responsive at least in part to one or more prior selected first-level messages, and the second-level message selecting means is responsive at least in part to one or more prior selected second-level messages. Thus, the first-level message selecting means avoids consecutive repetition of a prior selected first-level message, especially those associated with the selected story element. The second-level message selecting means avoids consecutive repetition of the prior selected second-level message of the selected character. The first-level message selecting means selects randomly (or serially) among the plurality of first-level messages associated with an active story element.

In one preferred embodiment, the character identifying means identifies a different character after the identified character is activated, thereby to define at least in part a cycle of interactive character activation associated with an active story element, but identifies the same character after a selected character other than the identified character is activated, thereby to await continuation of the cycle of interactive character activation. Means are provided for deactivating the character identifying means after a full cycle of interactive character activation related to an active story element.

The work may be in the form of a book containing a plurality of pages, at least a plurality of the pages including a different text portion, and at least a plurality of the different text portions identifying respective story elements to be selected. The book may include both primary text portions, which are to be read and indicate particular story elements to be selected, and associated secondary text portions, which set forth the first-level messages relative to the story elements which the associated primary text portion indicates should be selected.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1A:
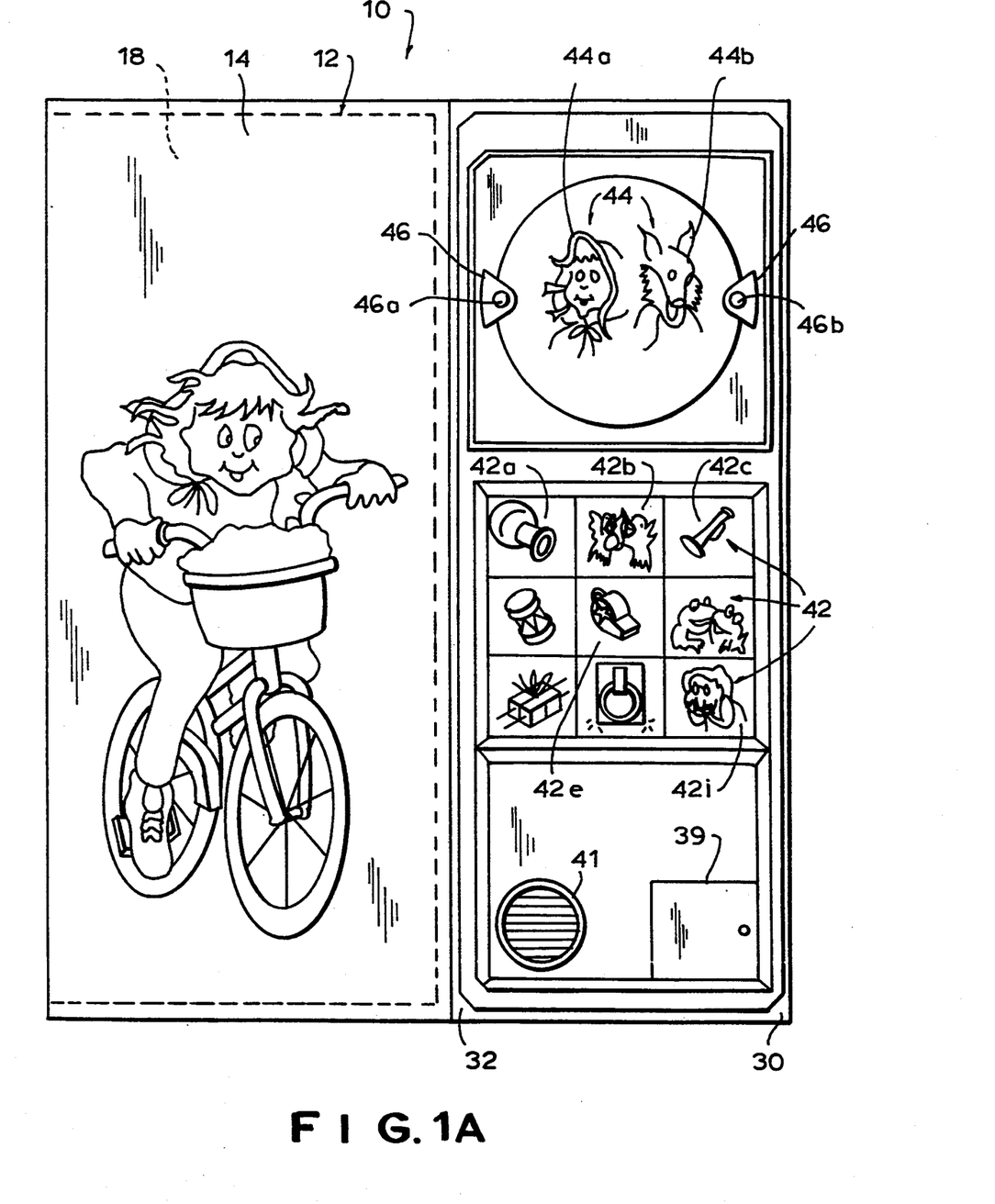
FIGS. 1A and 1B are top plan and isometric views, respectively, of an interactive audiovisual work according to the present invention with the book closed and open, respectively.
Figure 1B:
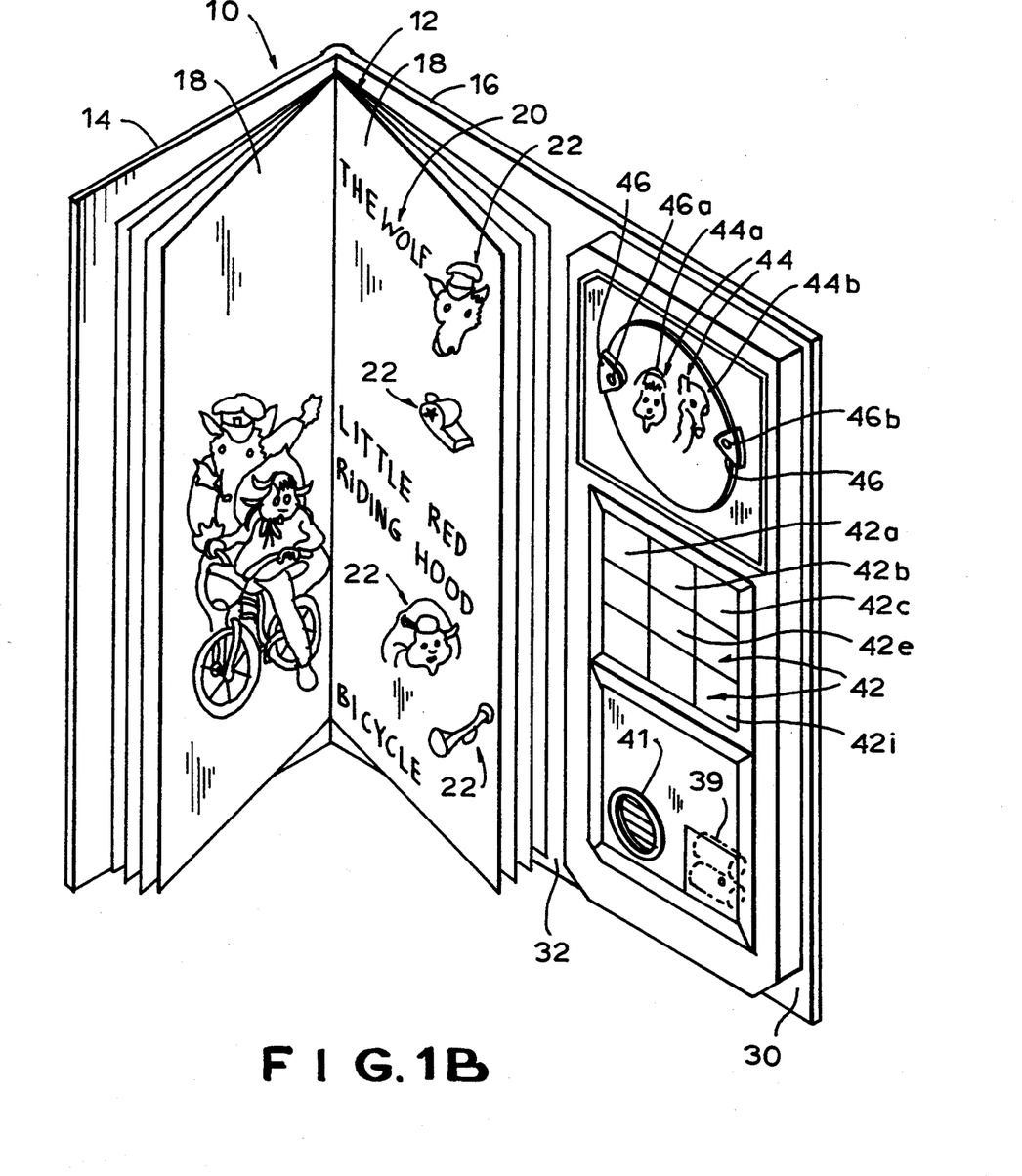

Referring now to the drawing, and in particular to FIG. 1 thereof, therein illustrated is an interactive audiovisual work according to the present invention, generally designated by the reference numeral 10. The work 10 is in the form of a book 12 having a relatively rigid front cover 14, a relatively rigid back cover 16 (each preferably made of paperboard), and a plurality of turnable pages 18 therebetween. On a plurality of the pages, and preferably each page, the page includes a different text portion 20 (which may be composed of words, graphics, symbols and combinations). A plurality of the different text portions 20 identify respective story elements to be selected, each story element preferably being identified by a symbol 22. Typically the text portions 20 are relatively short and are selected for readability by and comprehensibility to a child.

In one embodiment (not illustrated), the book 12 includes both primary text portions and secondary text portions. The primary text portions are the text portions 20 described above—they are to be read (either by the child-user or aloud by a parent) and indicate as a part thereof particular story elements which the user (or parent) should select as described hereinafter. The secondary text portions, when present, are associated with particular primary text portions and set forth the various first-level messages associated with the story elements which the associated primary text portion indicates should be selected. The secondary text portions are intended to be read only by an adult and to give the adult the first-level messages associated with the story elements indicated for selection. It may be appreciated, however, that while the primary text portion will indicate a particular story element to be selected, either through error or intentionally a user may select a different story element, in which case the secondary text portion may be inappropriate for the actually selected story element.

Mounted on an extension 30 of the book back cover 16 is a plastic housing 32 incorporating a sound chip generally designated 34 (see FIG. 3), a microprocessor generally designated 36 (see FIG. 3), and various control switches or selectors for reasons which will become apparent hereinafter. Visible from the front of the housing 32 is a battery compartment generally designated 38 (see FIG. 3) with a removable cover 39, a speaker generally designated 40 (see FIG. 3) with an outlet grille 41, a plurality of individual story element switches 42 (nine switches identified as 42a, 42b, . . . 42i being illustrated), a plurality of characters 44 (two characters being illustrated, namely, Little Red Riding Hood 44a and the Wolf 44b) and a like plurality of identifiers (two LED's 46a and 46b being illustrated), each identifier 46a, 46b being associated with a respective character 44a, 44b.

The characters 44 may be representations of humans, animals, cartoon characters and even anthropomorphized objects. The identifiers 46 are simply means for allowing the microprocessor 36 to communicate to the user which character 44a, 44b should be selected at any given time in order to further the telling of the story. Of the various selectors, switches and identifiers illustrated, only the identifiers 46 are under the control of the microprocessor 36, the story element switches 42 and the character selector 44 being under the control of the user.

The story element switches 42 are associated with respective text portions 20 or symbols 22 therein. Thus, the text portion 20 may read "Jack sees a cow," followed by a symbol or graphic representation 50 of a cow. The appearance of the symbol 22 in the text portion 20 indicates that the user should actuate the corresponding story element switch 42 bearing the same symbol 22. When he does this, the story element switch actuation results in a sound effect, such as a "moo" to represent the cow. It will be appreciated that practically any story element can be selected to be represented by a particular symbol and a sound associated conceptually with such a symbol. For example, references to a door (as a story element) may be indicated by the symbol of a door with the accompanying sound (upon actuation of a story element switch 42 with a door symbol on it) being either a creaking door or a slamming door, whichever is appropriate. Preferably, the story elements will be selected so that they can be used several times within a given book. (As will be seen hereinafter, a plurality of different first-level messages may be associated with at least one of the story elements so that the cycle of interactive character activation following actuation of a given story element may differ over time, thus retaining the interest of the user).

It will be appreciated that the plurality of differing actuatable story element switches 42 may be fewer or greater than the illustrated nine, and that the plurality of differing actuatable characters 44 of the story and the plurality of identifiers 46 (for identifying the character 44 intended to be selected to be active at a given time according to the story) may be greater than two. Indeed, there may be only a single identifier 46 for identifying the character intended to be selected, such as a rotatable pointer (not shown) which switches between the various characters under the control of the microprocessor.

In the embodiment illustrated, the character selector 44 for selecting one of the plurality of characters 44 to be activated is in fact the character representation 44 itself. Thus each character representation 44 constitutes a pressure-sensitive switch 44 which may be actuated by the user simply pressing the appropriate character representation. It will be appreciated, however, that in other embodiments the character representations 44 may be separate and apart from the character selectors 44. Thus, the character selector may be a plurality of on-off switches (not shown), each disposed adjacent a respective character representation 44, or it may even be a single pointer (not shown) on a rotatable knob, the knob being rotatable by the user to cause the pointer to align with one of the character representations at a time.

The microprocessor 36 is programmed to include sound-generating means responsive to the story element selector 42 (that is, which of the story element switches 42 is actuated), the character selector 44 (that is, which of the characters 44 is actuated), and the character identifier 46 (that is, which of the identifiers 46 is actuated). The sound-generating means causes the selected character to speak a first-level message associated with the selected story element 42a, 42b . . . 42i if the selected character and the identified character (that is, the character associated with the identifier 46) are the same. Otherwise, a second-level message associated with the selected character is spoken by the selected character.

The first-level message is more specific and more closely related to the selected story element than the second-level message. In other words, a second-level message is more general and less related to the selected story element than a first-level message. In fact, a second-level message is typically neutral, neither hindering nor advancing the conversation, but simply providing some general response—appropriate to a selected character—to a character activation which is out of sequence. In a way of speaking, it merely fills in a lull in the conversation until subsequently the identified character is selected by the user. The conversation can then proceed as intended with first-level messages.

Throughout the story, after each character identifier 46 identifies a particular character 44 and that identified character is then selected by the user and activated, the microprocessor 36 proceeds to identify a different character 44 with a different identifier 46. Thus, when the character selection sequence indicated by the successive character identifier 46 (under control of the microprocessor 46) is complied with, the work proceeds to define at least in part a cycle of interactive character activation associated with an active story element 42. In other words, the characters 44 proceed to tell part of the story. But when the user selects a character 44 other than the identified character, the character identifier 46 continues to identify the character 44 which should be selected. Thus, in this instance, the work awaits continuation of the cycle of interactive character activation in the story, merely filling the gap (caused by the user's erroneous character selection) with a neutral second-level message by the selected character 44. The cycle of interactive character activation associated with an active story element 42 continues until the cycle is completed, after which further selection of a character 44 by the user produces only an appropriate second-level message for that character.

In a preferred embodiment of the present invention, there is an exception to this rule when the user actuates a story element 42 before the cycle of interactive character activation for the present story element 42 is completed, regardless of whether the newly actuated story element is the same story element as that presently actuated or a different one. The premature activation of a story element (before the cycle of interactive character activation for the presently active story element is completed) interrupts and causes a termination of the presently active story element and commencement of the newly activated story element. If a contrary result desired by the game designer, the microprocessor 36 may be programmed so that the premature activation of a story element is simply ignored and the user is forced to complete one cycle of interactive character activation (associated with the presently activated story element) before he can commence a new one.

The microprocessor 36 includes means 58 for deactivating all character identifiers 46 after the full cycle of interactive character interaction related to an active story element, thereby to indicate (by a lack of any illuminated LED 46) that the user should return to the text portion 20 of the book 12 (which will typically in due course instruct the user to select another story element 42).

Once a new story element 42 is active, the same or a different sequence of character identifications will follow, typically with the characters 44 speaking first-level messages associated with the new active story element 42. Thus, since the sounds generated by each character 44 will typically vary depending upon the active story element 42, the user cannot easily predict what will be said by a given character at a given time, thereby ensuring an element of unpredictability and hence added play value. Because each story element 42 may have its own cycle of interactive character activation or conversation, the number of possible sound effects and speech phrases far exceeds the number of story elements 42, the number of characters 44, or the product thereof.

It should be appreciated that the "interactive character activation" need not be a conversation in the sense of one character speaking to the other and the other responding thereto. In fact, one character may be unaware of the presence of the other character. For example, in "Jack and the Beanstalk," a cycle of interactive character activation between one character hiding from another may proceed as follows: "I can see the Giant and he can't see me." "Jack must be here. Where is Jack?" "The Giant will never find me if I don't make any noise." In particular instances, neither character may be aware of the other. In any case, the interactive character activation or "conversation" may range from a single comment from one character to a number of comments from both characters, with different cycles of interactive character activation being of different lengths and continuing until the microprocessor deactivates all the character identifying means, thereby indicating that the user should return to the text portion.

If desired, one or more of the story element switches 42 may simply be a sound-generating switch which, upon actuation, produces a particular sound (such as a sound effect) without causing any identifier 46 to become actuated. Thus such a story element switch 42 simply causes the introduction of a sound effect, after which the user continues with the text portion 20.

The text portion 20 may call for selection of a character even when there is no actuated story element switch 42, especially at the beginning of a story before any story element switch 42 is actuated. In this case, the text portion 20 is simply calling for the indicated character to speak a second-level message.

It will be appreciated that the user of the present invention feels that he is a participant in the interactive character activation or conversation because none of the characters speak until he selects them. Thus, the user participates by controlling the timing of the character selections and the accuracy of the character selections relative to the identifiers. This produces an entirely different effect for the user than where he is merely a listener of an invariant dialogue and has no control over the substance and timing thereof once the dialogue has been initiated.

If desired, it is possible for minor characters, who may or may not be graphically depicted on the book cover as one of the characters (but, in any case, would not have an identifier associated therewith), to be included in an interactive character activation cycle. Thus, the minor character may be a dog and, at appropriate times, a "Woof, woof" or like message spoken by a dog may be appended to any first-level message spoken by any major character.

In order to further increase the play value by providing additional variety and unpredictability, in a preferred embodiment a plurality of differing first-level messages are associated with at least one of the story elements 42, with the microprocessor 36 including means for selecting the first-level message to be spoken from the plurality of different first-level messages associated with that selected story element 42 (see steps 124-130 of FIG. 3 to be described hereinafter). For example, if the selected character is Little Red Riding Hood, and the story element is her riding her bicycle (e.g., a bicycle bell graphic and a bicycle bell sound effect), there may be three alternative first-level messages to be spoken in response to the initial selection of her character. The three alternative first-level messages will typically be somewhat similar in meaning—for example, "I love to go fast!" or "Whoopee!" or "Wow! What fun!" Each of the three possible first-level messages furthers the story by expressing the pleasure of Little Red Riding Hood upon riding her bike.

The first-level message selecting means is preferably responsive at least in part to one or more prior selected first-level messages. More particularly, the first-level message selecting means may select either randomly (as illustrated) or serially among the plurality of alternative first-level messages associated with an active story element 42. When randomly selecting, as illustrated, the first-level message selecting means preferably avoids consecutive repetitions of a prior selected first-level message associated with the selected story element 42. This may be achieved (see steps 128-130) by noting the last or prior selected first-level message and comparing therewith the newly selected first-level message and, where they are the same, discarding the latter and selecting a new first-level message (subject again to the need for avoiding consecutive repetition of first-level messages). However, it will be apparent that where there are no more than three alternative first-level messages to be selected among, the first-level message selecting means may select serially among the plurality of first-level messages associated with an active story element with only a minor sacrifice in the randomness of the response.

The first-level message selecting means, when randomly selecting among at least three alternative first-level messages associated with an activated story element (as described above), may alternatively require that each of the plurality of messages be spoken before there is a repetition of any one. This may be achieved by flagging in the memory of the microprocessor each selected first-level messages as it is spoken, thereby indicating that it is not to be spoken again until each of the plurality of messages has been spoken. When all messages have been spoken, all flags can be removed and the process started anew. It will be appreciated that such a first-level message selecting means may result in consecutive repetition of a first-level message which is the last message to be spoken in one cycle and the first message to be spoken in the subsequent cycle. If desired, however, this possibility may be avoided by combining the technique for avoiding a consecutive repetition with the technique for causing all possible first-level messages to be spoken before there is a repetition of any one message.

In a preferred embodiment of the present invention, a plurality of differing second-level messages are associated with at least one, and preferably each, of the characters, with the microprocessor 36 including means (steps 124-130 again) for selecting the second-level message to be spoken from the plurality of different second-level messages associated with that selected character. The second-level message selecting means is preferably responsive at least in part to one or more prior selected second-level messages. The second-level message selecting means may select randomly or serially among the plurality of second-level messages associated with the selected character, and may include any or all of the techniques described above for avoiding consecutive repetition or for causing each of the plurality of second-level messages for a selected character to be spoken before any are repeated. Further details of the second-level message selecting means are not set forth in detail herein since they are essentially similar to the details set forth above regarding the first-level message selecting means.

It will be appreciated that in particular instances it may be desirable to have not just a single group of second-level messages for a character, but rather a plurality of such groups. For example, one group may express a generalized pleasure ("Good," "Great" or "Golly"), while another group may express a generalized displeausre ("Ugh," "No" or "Horrors"). In this sense, each second-level message group resembles somewhat a first-level message group.

Referring now to TABLE I, therein presented is a very abbreviated sample story table, which commences with Initialization ("Start: line 0") and proceeds to specific story elements such as "Birds" (lines 1 and 2) and "Bike" (lines 3 and 4).

The microprocessor 36 maintains in its memory the full story table which indicates for any instant a line number (pointed to by a story table line pointer), which LED's should be on or off ("char1 led" and "char2 led"), which phrases of the interactive character activations should be spoken by whatever character is selected ("char1 phrase" and "char2 phrase") and the line number (0, 1, 2, 3 . . . n) of the story table to which the story table line pointer should be set after a particular phrase has been spoken ("char1 next line" and "char2 next line").

The numbers under the header "phrase" are specific phrase codes, each of which indicates a particular sound or sound effect to be spoken or produced. The "bike group" (under "char2 phrase") is not a phrase code, but rather an indicator that one of a plurality of possible first-level messages is to be spoken. Thus the microprocessor must perform its subroutine for randomly selecting (or "serially selecting" if that is the case) the particular first-level message to be spoken from the group indicated—that is, here the "bike group"—subject to whatever provisions the microprocessor has been programmed with to prevent consecutive repetitions, to ensure that all members of a group are spoken before any are repeated, or the like.

The second-level messages identifiers under the header "phrase" are composed of three sequential factors as follows: (1) the term "neutral," second-level or the like, (2) the "1" or "2" as the character to be speaking the second-level message, and (3) "1" or "2" as the identifier of which group of second-level messages for the particular character should be selected. The microprocessor will perform its random (or serial) selection process within the indicated group of second-level messages for the character. Of course, in the actual microprocessor memory, the information within the story table will typically be greatly compressed.

TABLE I

STORY TABLE SAMPLE

| line number | char1 phrase | char1 next line | char1 led | char2 phrase | char2 next line | char2 led |
|---|---|---|---|---|---|---|
| Start: 0 | neutral11 | 0 | off | neutral21 | 0 | off |
| Birds: | | | | | | |
| 1 | 7 | 2 | on | neutral21 | 1 | off |
| 2 | neutral11 | 2 | off | 12 | 0 | on |
| Bike: | | | | | | |
| 3 | neutral11 | 3 | off | bike group | 4 | on |
| 4 | | | | | | |

Figure 2A:
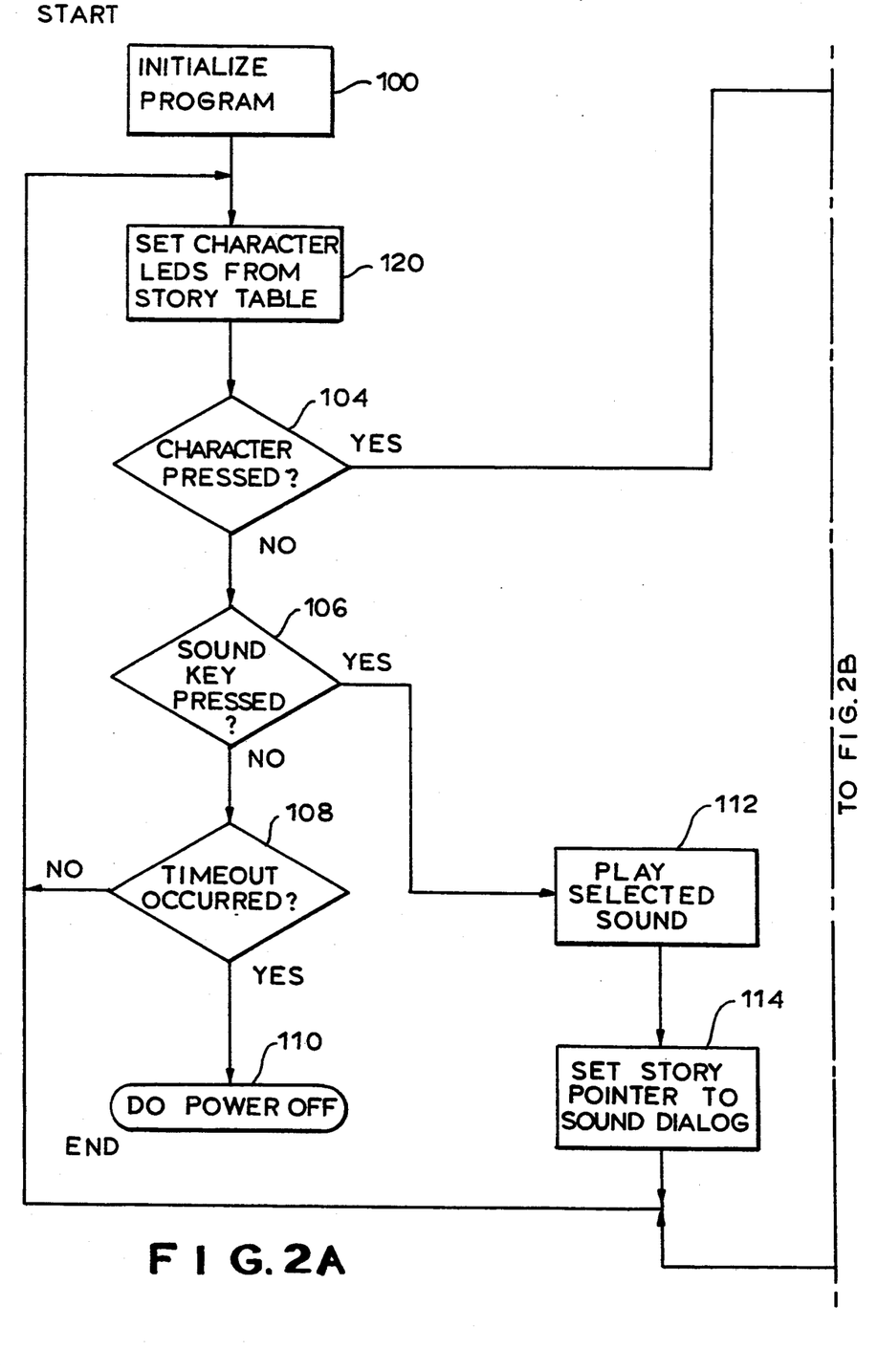
FIGS. 2A and 2B are a flow chart for operation of the microprocessor.
Figure 2B:
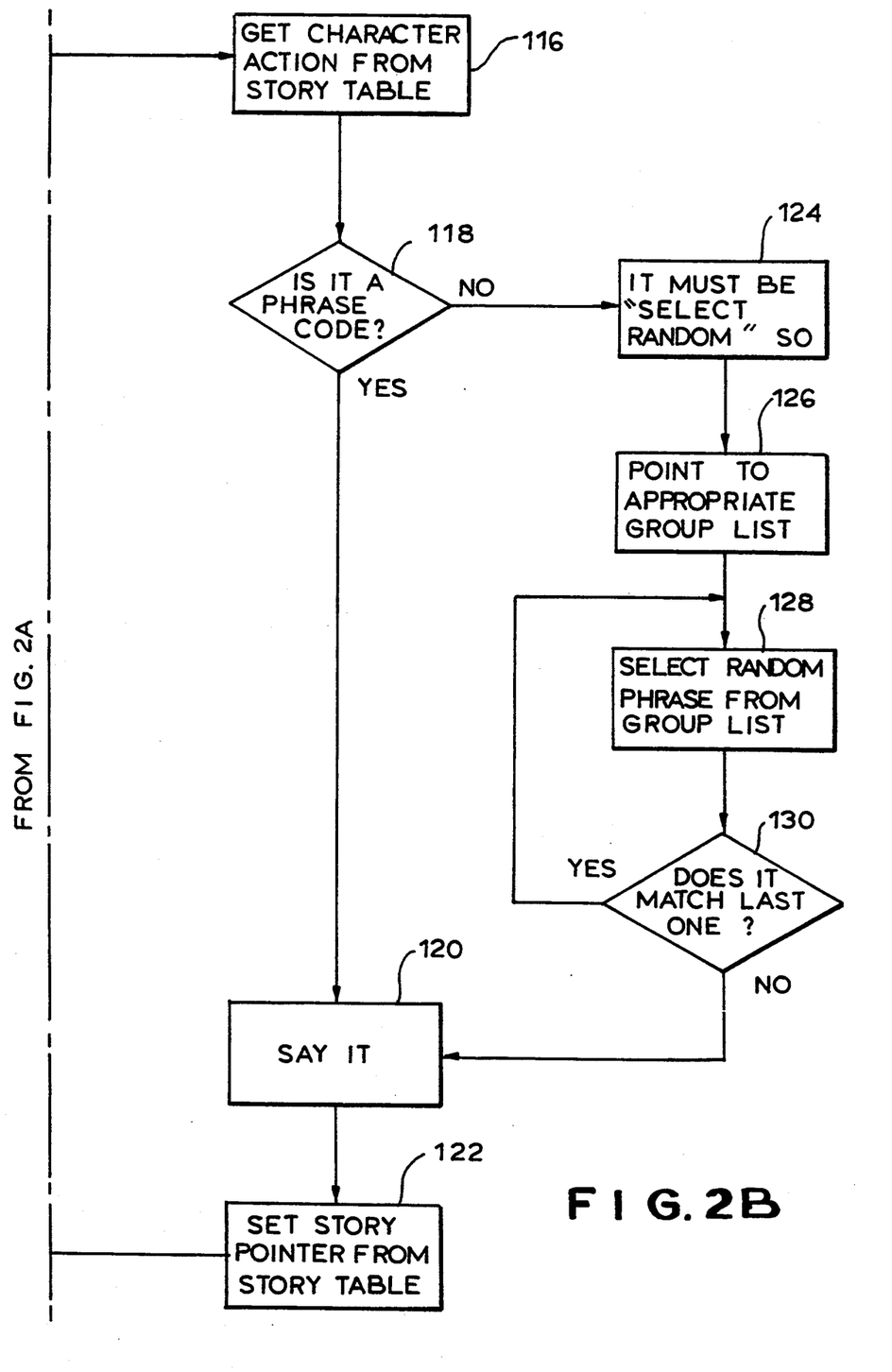

Referring now to FIG. 2, therein illustrated is a flow chart reflecting the activity of the microprocessor 36 and how it uses the story table described above. In step 100, the microprocessor responds to the actuation of any key or selector 42, 44 by initializing the program. In step 102, the microprocessor proceeds to the line of the story table indicated by the story table line pointer and turns the various LED identifiers 46 on or off according to the appropriate char1 led and char2 led instructions. As the initialization program sets the story pointer to line zero, initially both identifiers 46 are off.

In step 104 the microprocessor determines whether or not a character 44 was selected ("pressed"). If not, in step 106 the microprocessor determines whether or not a story element 42 ("sound key") was selected ("pressed"). If neither, in steps 107, 108 the microprocessor then determines whether or not a time-out has occurred, that is, whether a preset period of time (such as a minute) has passed after the last actuation without any further actuation. If so, in step 110 the power to the unit is turned off. On the other hand, if a time-out has not occurred, the microprocessor returns to step 102, leaving unchanged the status of the identifiers 46.

Assuming that in step 106 a story element 42 was selected ("sound key pressed"), then the microprocessor in step 112 causes the sound associated with that story element to be played and in step 114 sets the story pointer to the appropriate line in the story table for production of the messages associated with that selected story element 42. At this point the microprocessor returns to step 102 to set the appropriate character identifiers 46 as indicated in the appropriate story line—e.g., line zero if this is immediately after initialization or the first line of a particular story element of the story table (e.g., line 1 for "birds" or line 3 for "bike").

If in step 104 a character 44 was selected ("character pressed"), the microprocessor in step 118 proceeds to the line in the story table indicated by the story pointer, and determines whether or not the "phrase" in that line for the selected character is a specific message (that is, a phrase code indicated by a number in TABLE I). If it is indeed a phrase code, the microprocessor in step 120 causes the sound-generating chip to generate the appropriate electrical patterns for that phrase, and the speaker to "speak" the phrase. Thereafter, in step 122 the story table line pointer is adjusted as necessary (see "char1 next line" or char2 next line") to point to the indicated next line—which may be the same or a different line—and the microprocessor then returns to step 102 to await the next character or story element selection.

Returning now to step 118, if the "phrase" entry is not a phrase code (or number representing a particular message), then the microprocessor realizes that the "phrase" must be selected from a group of possible phrases (step 120) and in step 122 proceeds to the appropriate group list as indicated by the name (e.g., "bike group") for a first-level message or the two-digit number for a second-level message (with the first digit representing the character and the second digit representing the group). At this point, the microprocessor performs the subroutine described above for selecting a message randomly from the appropriate group list, while preventing consecutive repetition of any particular message by first selecting a message therefrom at random (step 124) and comparing it with the last message selected from the list (step 126), and returning to select a new message at random from the list if it is the same (step 124). Assuming that the message selected from the group list is not a consecutive repetition of the last message selected from the group list, the microprocessor proceeds to speak the message (step 120), set the story table line pointer appropriately (step 122) and finally return to step 102.

Thus it will be appreciated that the microprocessor, operating under the guidance of the story table in its memory, is able to sense the character selector 44 and story element selector 42, control the setting of the character identifiers 46, and cause the appropriate first- and second-level messages to be spoken.

Figure 3:
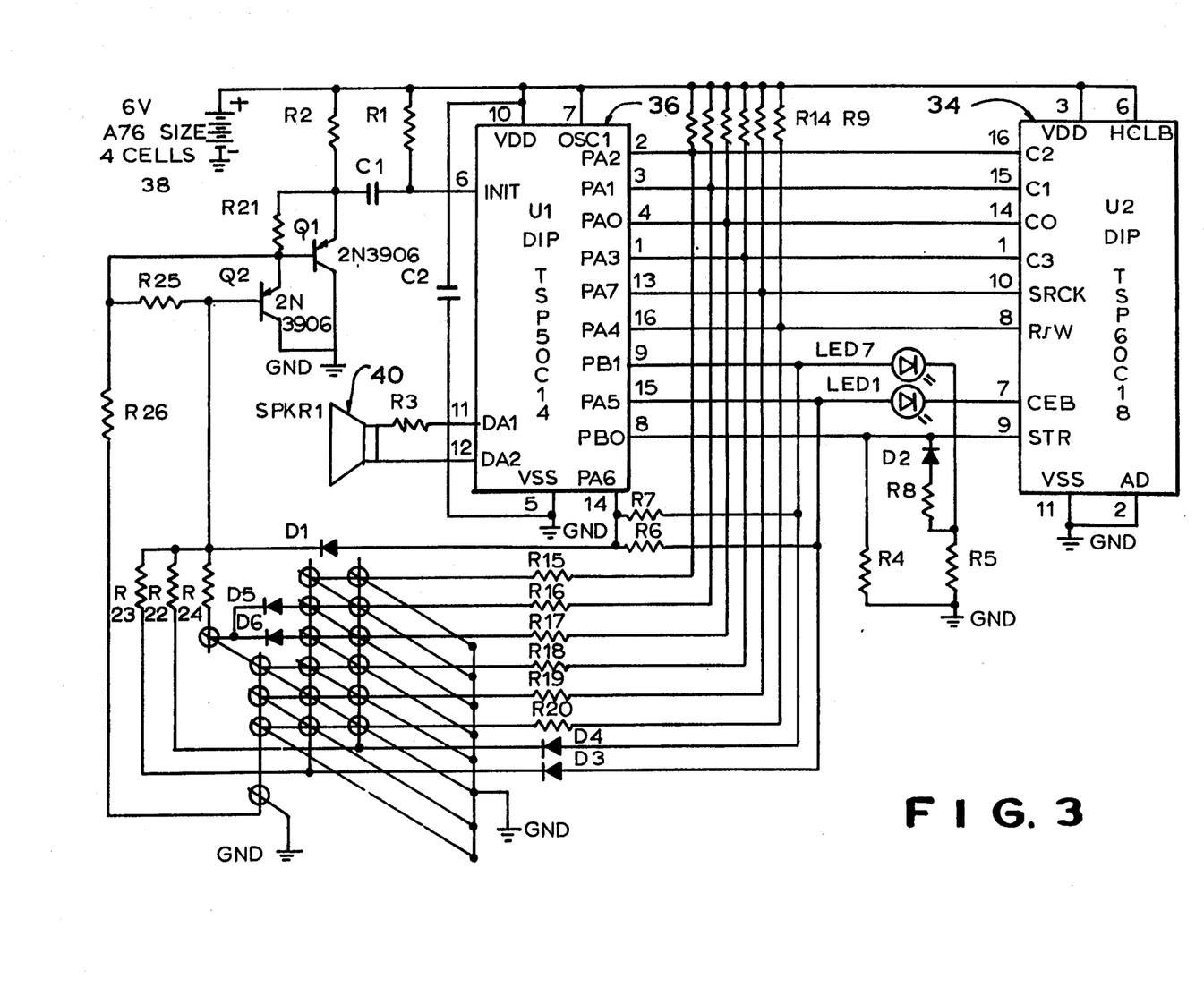
FIG. 3 is a circuit diagram of the work.

Referring now to FIG. 3, therein illustrated is a circuit diagram illustrating the hardware of the present invention. Controller U1, the chip 50C14, contains all program code. Speech ROM U2, the chip 60C18, contains all of the speech and sound effects data.

To initialize:

When unit is OFF, any key 42, 44 pressed will "turn on" transistor Q1. This sends a pulse through Capacitor C1 which resets the Controller and brings it out of its "sleep" state.

The Controller immediately pulls its A6 line high. This prevents resets from the character keys 44. This situation remains until the unit turns itself off.

In order to read key presses:
1) Controller pulls its A5 line high, which disables the Speech ROM. This prevents the Speech ROM from interfering with the key reading;
2) Controller reads its A0, A1, A2, A3, A4, A7 and B1 lines to find key presses from the B group of keys. (Any key pressed from this group will pull B1 low along with only one of the A0, A1, A2, A3, A4, A7 lines);
3) Controller pulls its B15 line high, which disables the Speech ROM;
4) Controller reads its A0, A1, A2, A3, A4, A7, and A5 lines to find key presses from the A group of keys. (Any key pressed from this group will pull A5 low along with only one of the A0, A1, A2, A3, A4, A7 lines.)

In order to "speak":
1) Controller pulls its A5 and B1 lines low, which activates the Speech ROM by allowing resistor R5 to pull the Speech ROM CEB low;
2) Controller uses its B0, A4, A0, A1, A2, A3, and A7 lines to get data from the Speech ROM;
3) Controller processes data to produce digitized speech or sound at its DA1 & DA2 pins.

During speaking, the high values of the resistors (R9, R10, 11, R12, R13, R14, R15, R16, R17, R18, R19, R20) prevent any key presses from interfering with the Controller/Speech ROM communication.

To light LED 1:
1) Controller pulls its B1 line low;
2) Controller pulls its A5 line high; and
3) Controller pulls its B0 line low.

To light LED 2:
1) Controller pulls its A5 line low;
2) Controller pulls its B1 line high; and
3) Controller pulls its B0 line low.

In order to use the work, the child (or adult playing with the child) reads the instructions from the first text portion 20, the instructions being simple yet complete: "Every time you come to a picture in the printed story, press a matching picture on the electronic sound pad. When you see a light blinking, press the character next to the light, and that character will talk."

To summarize, the present invention provides an interactive audio visual work for telling a story wherein there are more sound effects (including conversations) than there are story element switches; in other words, actuation of a given story element switch may, at different times, result in the generation of different sound effects or speech phrases. The work can mimic or simulate interactive or alternating character activations (typically conversations) in which the user participates by selecting which character talk when. The user is unable to substantively alter the conversation produced in response to actuation of a story element switch, being able only to delay the conversation completion (by causing neutral message interjections thereinto) or terminate the conversation (by activating a story element).

Now that the preferred embodiments of the present various invention have been shown and described in detail, modifications and improvements thereon will become readily apparent to those skilled in the art. Accordingly, the spirit and scope of the present invention is to be construed broadly and limited only by the appended claims, and not by the foregoing specification.

I claim:

1. An interactive audiovisual work for telling a story, comprising:
   (A) a plurality of differing actuable story elements of the story;
   (B) a plurality of differing actuable characters of the story;
   (C) a plurality of differing first-level messages associated with said characters for at least some of said story elements and forming an optional part of the story, said first-level messages associated with a given character varying with the associated story element of the story;
   (D) a plurality of differing second-level messages associated with said characters;
   (E) a story element selector for selecting one of said plurality of story elements to be active;
   (F) a character selector for selecting one of said plurality of characters to be the selected character;
   (G) means, active after a story element is selected, for identifying the character intended to be selected by the user to be the selected character at a given time according to the story; and
   (H) means, responsive to said story element selector, said character selector and said character identifying means, for causing the selected character to speak a first-level message associated with the selected character and with the selected story element if the selected character and the identified character are the same, and a second-level message associated with the selected character otherwise.

2. The work of claim 1 wherein a first-level message is more specific and closely related to the selected story element than a second-level message.

3. The work of claim 1 wherein a second-level message is more general and less related to the selected story element than a first-level message.

4. The work of claim 1 wherein said story element selector produces a sound associated with the selected story element.

5. The work of claim 1 wherein a plurality of differing first-level messages are associated with at least one of said story elements, and additionally including means for selecting the first-level message to be spoken from said plurality of differing first-level messages associated with a selected story element.

6. The work of claim 1 additionally including means for selecting the second-level message to be spoken from said plurality of differing second-level messages.

7. The work of claim 5 wherein a plurality of differing second-level messages are associated with each of said characters, and additionally including means for selecting the second-level message to be spoken from said plurality of differing second-level messages associated with a selected character.

8. The work of claim 5 wherein said first-level message selecting means is responsive at least in part to one or more prior selected first-level messages.

9. The work of claim 7 wherein said second-level message selecting means is responsive at least in part to one or more prior selected second-level messages.

10. The work of claim 8 wherein said first-level message selecting means avoids consecutive repetition of a prior selected first-level message.

11. The work of claim 8 wherein said first-level message selecting means avoids consecutive repetition of the prior selected first-level messages associated with the selected story element.

12. The work of claim 9 wherein said second-level message selecting means avoids consecutive repetition of the prior selected second-level message of the selected character.

13. The work of claim 5 wherein said first-level message selecting means selects randomly among said plurality of first-level messages associated with an active story element.

14. The work of claim 1 wherein said character identifying means identifies a different character after the identified character is activated, thereby to define at least in part a cycle of interactive character activation associated with an active story element, but identifies the same character after a selected character other than the identified character is activated, thereby to await continuation of the cycle of interactive character activation.

15. The work of claim 14 additionally including means for deactivating said character identifying means after a full cycle of interactive character activation related to an active story element.

16. The work of claim 1 additionally including a book containing a plurality of pages, at least a plurality of said pages including a different text portion, and at least a plurality of said different text portions identifying respective story elements to be selected.

17. The work of claim 16 wherein said book includes both primary text portions which are to be read and indicate particular story elements to be selected and associated secondary text portions which set forth the first-level messages relative to the story elements which the associated primary text portion indicates should be selected.

18. An interactive audiovisual work for telling a story, comprising:
(A) a plurality of differing actuatable story elements of the story;
(B) a plurality of differing actuatable characters of the story;
(C) a plurality of differing first-level messages associated with said character for at least some of said story elements and forming an optional part of the story, said first-level message associated with a given character varying with the associated story element of the story;
(D) a plurality of differing second-level messages associated with said characters;
(E) a story element selector for selecting one of said plurality of story elements to be the selected character and producing a sound associated with the selected story element;
(F) a character selector for selecting one of said plurality of characters to be active;
(G) means, active after a story element is selected, for identifying the character intended to be selected by the user to be the selected character at a given time according to the story; said character identifying means identifying a different character after the identified character is activated, thereby to define at least in part a cycle of interactive character activation associated with an active story element, but identifying the same character after a selected character other than the identified character is activated, thereby to await continuation of the cycle of interactive character activation;
(H) means, responsive to said story element selector, said character selector and said character identifying means, for causing the selected character to speak a first-level message associated with the selected character and wish the selected story element if the selected character and the identified character are the same, and a second-level message associated with the selected character otherwise; a first-level message being more specific and closely related to the selected story element than a second-level message, and a second-level message being more general and less related to the selected story element than a first-level message; a plurality of differing first-level messages being associated with at least one of said story elements, and a plurality of differing second-level messages being associated with each of said characters;
(I) means for randomly selecting the first-level message to be spoken from said plurality of differing first-level messages associated with an active story element;
(J) means for selecting the second-level message to be spoken from said plurality of differing second-level messages associated with a selected character, so as to avoid consecutive repetition of the prior selected second-level messages associated with the selected character; and
(K) means for deactivating said character identifying means after a full cycle of interactive character activations related to an active story element.

19. The work of claim 18 additionally including a book containing a plurality of pages, at least a plurality of said pages including a different text portion, at least a plurality of said different text portions identifying respective story elements to be selected, said book including both primary text portions which are to be read and indicate particular story elements to be selected and associated secondary text portions which set forth the first-level messages relative to the story elements which the associated primary text portion indicates should be selected.

* * * * *